(12) United States Patent
Makino et al.

(10) Patent No.: US 9,354,359 B2
(45) Date of Patent: May 31, 2016

(54) PRECURSOR SOL OF ALUMINUM OXIDE AND METHOD FOR MANUFACTURING THE SAME, METHOD FOR MANUFACTURING OPTICAL MEMBER, OPTICAL MEMBER, AND OPTICAL SYSTEM

(71) Applicant: CANON KABUSHIKI KAISHA, Tokyo (JP)

(72) Inventors: Kenji Makino, Tokyo (JP); Tomonari Nakayama, Yokohama (JP); Keiko Abe, Kawasaki (JP); Katsuaki Kuge, Yokohama (JP); Hijiri Hasegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 13/830,061

(22) Filed: Mar. 14, 2013

(65) Prior Publication Data

US 2013/0258480 A1     Oct. 3, 2013

(30) Foreign Application Priority Data

Mar. 29, 2012   (JP) ................. 2012-077503

(51) Int. Cl.
| | |
|---|---|
| G02B 27/00 | (2006.01) |
| G02B 1/113 | (2015.01) |
| C09D 1/00 | (2006.01) |
| C09D 5/00 | (2006.01) |
| G02B 1/11 | (2015.01) |
| G02B 1/118 | (2015.01) |
| C01F 7/02 | (2006.01) |

(52) U.S. Cl.
CPC ...... *G02B 1/113* (2013.01); *C09D 1/00* (2013.01); *C09D 5/006* (2013.01); *G02B 1/11* (2013.01); *G02B 1/118* (2013.01); *C01F 7/02* (2013.01)

(58) Field of Classification Search
None
See application file for complete search history.

(56) References Cited

U.S. PATENT DOCUMENTS

| 5,133,918 A | 7/1992 | Jung | |
|---|---|---|---|
| 8,580,026 B2 * | 11/2013 | Makino | ............ C03C 1/008 106/287.17 |
| 2008/0310026 A1 | 12/2008 | Nakayama | |
| 2011/0274878 A1 * | 11/2011 | Makino | ............ C03C 1/008 428/141 |

FOREIGN PATENT DOCUMENTS

| CN | 101646960 A | 2/2010 |
|---|---|---|
| CN | 102267711 A | 12/2011 |
| EP | 2236462 A2 | 10/2010 |
| EP | 2390229 A1 | 11/2011 |
| JP | 50-70040 A | 6/1975 |
| JP | 9-202649 A | 8/1997 |

* cited by examiner

*Primary Examiner* — Arnel C Lavarias
(74) *Attorney, Agent, or Firm* — Canon U.S.A., Inc., IP Division

(57) ABSTRACT

A precursor sol of aluminum oxide includes particles containing a hydrolysate and/or a condensate of an aluminum compound, a solvent, and an organo aluminum compound. When a pulsed-NMR $T_2$ relaxation curve of nuclide $^1H$ of the precursor sol of aluminum oxide includes two components with different $T_2$ relaxation times and the component with the longer $T_2$ relaxation time has an abundance level of $C_L$ (%) and the component with the shorter $T_2$ relaxation time has an abundance level of $C_S$ (%), the relative proportion $R_{CS}$ (%) defined by $[\{C_S/(C_S+C_L)\}\times 100]$ is in the range of 23.5% to 50.0%, both inclusive.

8 Claims, 6 Drawing Sheets

PRECURSOR SOL OF ALUMINUM OXIDE AND METHOD FOR MANUFACTURING THE SAME, METHOD FOR MANUFACTURING OPTICAL MEMBER, OPTICAL MEMBER, AND OPTICAL SYSTEM

BACKGROUND OF THE INVENTION

1. Field of the Invention

The present invention relates to a precursor sol of aluminum oxide (sol as a precursor to an aluminum oxide film) and a method for manufacturing it and to a method for manufacturing an optical member, an optical member, and an optical system. More specifically, the present invention relates to a precursor sol of aluminum oxide that produces an optical coating relatively free of cracks and highly antireflective against light in a broad wavelength range including the visible range and to a method for manufacturing this sol as well as to a method for manufacturing an optical member, an optical member, and an optical system similarly advantageous.

2. Description of the Related Art

Antireflective structures having a fine structure smaller than the wavelengths in the visible range offer excellent antireflective properties against light in a broad wavelength range when the fine structure have an appropriate height and are arranged at appropriate pitches. A known way to produce such a fine structure is to apply a solution containing fine particles smaller than the visible wavelengths to a base and then form a coating containing a periodically distributed 100-nm to 250-nm fine structure.

There is also a technique in which fine processing equipment such as an electron-beam, laser interference, or semiconductor lithography system or an etching machine is used to form a pattern, and by this technique it is possible to produce a fine structure with controlled pitch and height and excellent antireflective properties (Japanese Patent Laid-Open No. 50-70040).

In another known method, a film of boehmite, i.e., an oxide hydroxide form of aluminum, is grown on a base until the film has an antireflective effect. This method produces an antireflection coating in the following way: An aluminum oxide film is formed on a base by vacuum coating or a liquid-phase (sol-gel) method followed by drying or baking, and the obtained film is treated with steam or immersed in hot water to form a fine structure of boehmite on the surface of the base (Japanese Patent Laid-Open No. 9-202649).

An antireflection coating produced using a fine structure of an aluminum compound has excellent antireflective properties owing to its very low vertical incidence reflectance and oblique-incidence reflectance. However, the antireflective properties of an antireflection coating based on a fine structure of an aluminum compound are sensitive to changes in the pitch and height of the fine structure.

In particular, its antireflective properties against obliquely incident light are acutely sensitive to the pitch and height of its fine structure. Given a fixed pitch of a fine structure, increasing the height of the fine structure leads to improved antireflective properties against obliquely incident light, but this requires the aluminum oxide film be thicker and have no or few cracks despite its increased thickness.

When a liquid-phase (sol-gel) method is used, the drying or baking operation following film formation produces heat and evaporates the organic solvent contained in the film, putting the film under tensile stress. The tensile stress becomes greater with increasing thickness of the film and as the measurement point is closer to the surface. It is therefore difficult to form a thick film on a base with a known precursor sol of aluminum oxide because the formed form easily cracks when dried or baked.

SUMMARY OF THE INVENTION

Thus, there is a strong demand for a precursor sol of aluminum oxide that can be applied to a base by such a liquid-phase (sol-gel) method as the above one, in which an antireflection coating is formed using a precursor sol of aluminum oxide, and produces a thick film without cracks. A method for manufacturing such a precursor sol of aluminum oxide and a method for manufacturing an optical member based on the use of this sol are also in demand.

The present invention, made under these circumstances, provides a precursor sol of aluminum oxide and a method for manufacturing it. A film formed using this sol is relieved from tensile stress associated with the subsequent drying or baking operation and thus the coating left after the drying or baking operation has no or few cracks even when it is relatively thick. A method for manufacturing an optical member, an optical member, and an optical system based on the use of this precursor sol of aluminum oxide are also provided.

A precursor sol of aluminum oxide that solves the above problems includes at least particles containing a hydrolysate and/or a condensate of an aluminum compound, a solvent, and an organo aluminum compound represented by general formula (1). When a pulsed-NMR $T_2$ relaxation curve of nuclide $^1H$ of the precursor sol of aluminum oxide includes two components with different $T_2$ relaxation times and the component with the longer $T_2$ relaxation time has an abundance level of $C_L$ (%) and the component with the shorter $T_2$ relaxation time has an abundance level of $C_S$ (%), the relative proportion $R_{CS}$ (%) of $C_S$ determined by equation (1) is in the range of 23.5% to 50.0%, both inclusive:

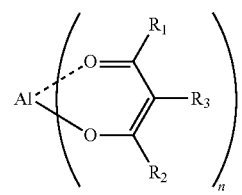

General formula (1)

(where $R_1$ and $R_2$ denote an alkyl, perfluoroalkyl, or allyl group of one to six carbon atoms, $R_3$ denotes a hydrogen atom, a halogen atom, or an alkyl, perfluoroalkyl, allyl, or aryl group of one to six carbon atoms, and n denotes an integer of 1 to 3, both inclusive).

$$R_{cs} = \frac{C_S}{C_S + C_L} \times 100 \qquad (1)$$

The above problems can also be solved by a method for manufacturing a precursor sol of aluminum oxide. The resulting sol includes particles containing a hydrolysate and/or a condensate of an aluminum compound, a solvent, and an organo aluminum compound represented by general formula (1). This manufacturing method includes at least (A) adding and mixing some amount of a β-diketone and either an aluminum alkoxide or an aluminum salt in the solvent to produce an aluminum compound solution, (B) adding and mixing some amount of water with or without a catalyst in the solution obtained in (A) to form a condensate of the aluminum alkoxide or aluminum salt and the organo aluminum compound represented by general formula (1), and (C) heating the solution obtained in (B) to a temperature of 60° C. to 150° C., both inclusive, to obtain the precursor sol of aluminum oxide, wherein the amount of the β-diketone, the amount of the water added with or without a catalyst, or the temperature of heating the solution obtained in (B) is adjusted so that when a pulsed-NMR $T_2$ relaxation curve of nuclide $^1$H of the precursor sol of aluminum oxide includes two components with different $T_2$ relaxation times and the component with the longer $T_2$ relaxation time has an abundance level of $C_L$ (%) and the component with the shorter $T_2$ relaxation time has an abundance level of $C_S$ (%), the relative proportion $R_{CS}$ (%) of $C_S$ determined by equation (1) is in the range of 23.5% to 50.0%, both inclusive:

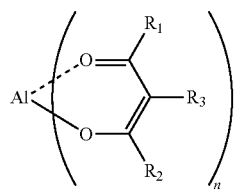

General formula (1)

(where $R_1$ and $R_2$ denote an alkyl, perfluoroalkyl, or allyl group of one to six carbon atoms, $R_3$ denotes a hydrogen atom, a halogen atom, or an alkyl, perfluoroalkyl, allyl, or aryl group of one to six carbon atoms, and n denotes an integer of 1 to 3, both inclusive).

$$R_{cs} = \frac{C_S}{C_S + C_L} \times 100 \qquad (1)$$

The above problems can also be solved by a method for manufacturing an optical member. This manufacturing method includes (a) supplying the precursor sol of aluminum oxide to at least either side of a base, (b) drying and/or baking the precursor sol of aluminum oxide supplied to the base to form an aluminum oxide film, and (c) bringing the aluminum oxide film into contact with hot water or steam at 60° C. to 100° C., both inclusive, to make a crystalline matter containing aluminum oxide separate out, thereby forming a textured structure containing aluminum oxide crystals.

The present invention also has other aspects. One is an optical member produced by the method for manufacturing an optical member described above.

Another aspect of the invention is an optical system that has this optical member.

Further features of the present invention will become apparent from the following description of exemplary embodiments with reference to the attached drawings.

DESCRIPTION OF THE EMBODIMENTS

Figure 1:
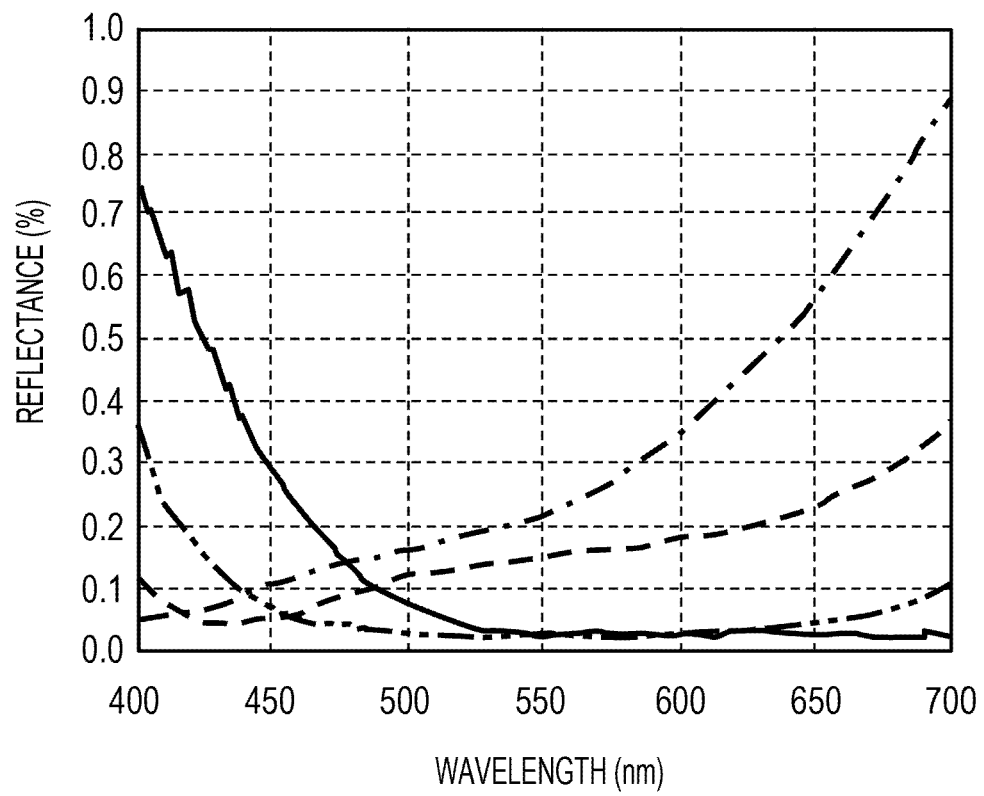
FIG. 1 shows plots of the wavelength of light (nm) versus reflectance (%) for an optical member produced using a precursor sol of aluminum oxide according to an aspect of the invention.

The following describes some embodiments of the invention in detail.

An aspect of the invention is a precursor sol of aluminum oxide, and this sol includes particles containing a hydrolysate and/or a condensate of an aluminum compound, a solvent, and an organo aluminum compound represented by general formula (1). When a pulsed-NMR $T_2$ relaxation curve of nuclide $^1$H of the precursor sol of aluminum oxide includes two components with different $T_2$ relaxation times and the component with the longer $T_2$ relaxation time has an abundance level of $C_L$ (%) and the component with the shorter $T_2$ relaxation time has an abundance level of $C_S$ (%), the relative proportion $R_{CS}$ (%) of $C_S$ determined by equation (1) is in the range of 23.5% to 50.0%, both inclusive:

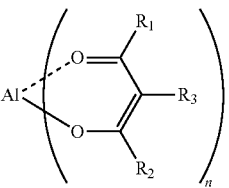

General formula (1)

(where $R_1$ and $R_2$ denote an alkyl, perfluoroalkyl, or allyl group of one to six carbon atoms, $R_3$ denotes a hydrogen atom, a halogen atom, or an alkyl, perfluoroalkyl, allyl, or aryl group of one to six carbon atoms, and n denotes an integer of 1 to 3, both inclusive).

$$R_{cs} = \frac{C_S}{C_S + C_L} \times 100 \qquad (1)$$

Another aspect of the invention is a method for manufacturing a precursor sol of aluminum oxide. This manufacturing method includes at least the operations described below, and the resulting sol includes particles containing a hydrolysate and/or a condensate of an aluminum compound, a solvent, and an organo aluminum compound represented by general formula (1):

(A) adding and mixing some amount of a β-diketone and either an aluminum alkoxide or an aluminum salt in the solvent to produce an aluminum compound solution;

(B) adding and mixing some amount of water with or without a catalyst to the solution obtained in (A) to form a condensate of the aluminum alkoxide or aluminum salt and the organo aluminum compound represented by general formula (1); and (C) heating the solution obtained in (B) to a temperature of 60° C. to 150° C., both inclusive, to obtain the precursor sol of aluminum oxide, wherein the amount of the β-diketone, the amount of the water added with or without a catalyst, or the temperature of heating the solution obtained in (B) is adjusted so that when a pulsed-NMR $T_2$ relaxation curve of nuclide $^1H$ of the precursor sol of aluminum oxide includes two components with different $T_2$ relaxation times and the component with the longer $T_2$ relaxation time has an abundance level of $C_L$ (%) and the component with the shorter $T_2$ relaxation time has an abundance level of $C_S$ (%), the relative proportion $R_{CS}$ (%) of $C_S$ determined by equation (1) is in the range of 23.5% to 50.0%, both inclusive.

A coating obtained by applying the precursor sol of aluminum oxide according to an aspect of the invention to a base and drying the formed film has no or few cracks even when having a relatively large thickness. Bringing this coating into contact with hot water or steam produces bumps (features) containing aluminum oxide crystals, and these bumps (features) and the spaces existing between them form a textured structure. This coating can also be used in the manufacturing method of an optical member according to another aspect of the invention described later herein.

The term aluminum oxide crystals, as used herein, refers to a crystalline matter containing 50 wt % or more of aluminum oxide or hydroxide in a hydrated or anhydrous form. Boehmite is also included. Aluminum oxides and hydroxides, including hydrated and anhydrous forms, are herein collectively referred to as aluminum oxide. Likewise, the term textured structure containing aluminum oxide crystals refers to a textured structure formed by features (bumps) containing 50 wt % or more of aluminum oxide crystals and the spaces existing between them, and the term aluminum oxide film represents a film containing 50 wt % or more of aluminum oxide.

FIG. 1 shows plots of the wavelength of light (nm) versus reflectance (%) for an optical member produced using a precursor sol of aluminum oxide according to an aspect of the invention. The reflectance curves in FIG. 1 were calculated by optical simulations, which were conducted assuming an optical member having a textured structure formed in the following way and visible light incident on this optical member: A coating ($n_d$=1.62) is formed on a base ($n_d$=1.80), the base is further coated with an aluminum oxide film formed using the precursor sol of aluminum oxide according to an aspect of the invention to have either of two different thicknesses, and the formed aluminum oxide film is brought into contact with hot water or steam to form features (bumps) containing aluminum oxide crystals. In the graph, the thickness of the thicker film before the contact with hot water (immersion in hot water) was set at 160 nm, and that of the thinner film before the contact with hot water (immersion in hot water) was set at 130 nm. As can be seen from the curves, increasing the thickness of the aluminum oxide film caused the bump-shaped structure containing aluminum oxide crystals to be deformed, thereby reducing the oblique-incidence reflectance of the film. An aluminum oxide film having a thickness of 140 nm or more can therefore have a sufficiently low oblique-incidence reflectance.

However, a coating formed on a base may have a larger thickness in a portion than in the remaining portion depending on the shape of the base (e.g., the circumferential region of a high-curvature lens) and the principle of the coating method chosen. An aluminum oxide film having a thickness of 160 nm or more without cracks could have sufficiently high antireflective properties for use as an optical element.

One cause of cracks in an aluminum oxide film is some forms of tensile stress. An aluminum oxide film cracks when the difference between the tensile stress exerted on the film and the force the film internally produces to keep its volume increases and goes beyond the tensile strength of the film.

One form of the tensile stress occurs because the solvent is evaporated while the base is dried and/or baked. As this form of tensile stress is associated with capillary force, dilating the interparticle pores in the particulate constituent of the film, i.e., the particles containing a hydrolysate and/or a condensate of an aluminum compound, leads to the prevention of cracks. Furthermore, the drying and/or baking operation produces heat that makes the base and the film expand. This causes another form of the tensile stress, which is attributable to the difference in the coefficient of thermal expansion between the base and the film. The greater the difference between the heating and cooling temperatures is, the greater this form of tensile stress is. For this reason, the drying and/or baking operation can be conducted at the lowest possible temperature.

There are two possible ways to dilate the interparticle pores of the particles containing a hydrolysate and/or a condensate of an aluminum compound in the film: to make the particles larger by promoting the hydrolysis and condensation of the aluminum alkoxide or to make each particle surrounded by molecules of another kind that serve as spacers. Excessive promotion of the hydrolysis and condensation reactions, however, would cause the particles to grow too fast. The coating formed using the resulting sol would be uneven because the sol would have formed a gel; the former could make the sol unsuitable for use as coating solution. The latter does not require the growth of particles themselves and thus is unlikely to cause the formation of a gel.

In the precursor sol of aluminum oxide according to an aspect of the invention, molecules of the solvent are coordinated to each of the particles containing a hydrolysate and/or a condensate of an aluminum compound. When the precursor sol of aluminum oxide according to an aspect of the invention is applied to a base and the formed film is dried and/or baked, a possible evaporation process of the solvent in the film is as follows: the solvent molecules left uncoordinated are evaporated through interparticle pores first, and the solvent molecules surrounding the particles follow. The interparticle pores maintain their size while the solvent is evaporated and thus the related tensile stress is reduced. This approach, in which the particles in the film are surrounded by molecules of another kind that serve as spacers, also requires the hydrolysis of the aluminum compound proceed to some extent so that there should be a sufficient number of reactive sites on the aluminum compound molecules to form coordinate bonds with solvent molecules.

Although the particles in the sol must be surrounded by solvent molecules and have an increased apparent average size as measured by dynamic light scattering or a similar technique, an increased apparent average particle size does not necessarily mean the coordination of solvent molecules to the particles, i.e., the formation of a precursor sol of aluminum oxide effective for the prevention of cracks, because the increase may simply be a result of growth of the particles. Furthermore, it is usually difficult to determine which of these two states the particles are actually in.

In aspects of the invention, the state of the particles containing a hydrolysate and/or a condensate of an aluminum compound in the precursor sol of aluminum oxide is determined by measuring the $T_2$ relaxation times of nuclide $^1$H in the sol by pulsed NMR (nuclear magnetic resonance). An example of pulsed NMR methods that can be used is the CPMG (Carr Purcell Meiboom Gill) method. Pulsed NMR analysis to determine the above $T_2$ relaxation times of a precursor sol of aluminum oxide requires the temperature be constant.

When the precursor sol of aluminum oxide contains two or more components with different degrees of motility, the abundance levels of these components can be determined from the differences between their $T_2$ relaxation times.

The measured data are analyzed by multicomponent curve fitting using equation (2):

$$M(t)=C_A \cdot \exp(-t/T_{2A})+C_B \cdot \exp(-t/T_{2B})+ \ldots \quad (2)$$

where M represents an NMR signal (magnetization) and is a function of the measurement time t, $C_A$ and $C_B$ denote the abundance levels (%) of components A and B in the system, respectively, and $T_{2A}$ and $T_{2B}$ denote the relaxation times (ms) of components A and B, respectively.

Coordination of solvent molecules to the particles containing a hydrolysate and/or a condensate of an aluminum compound in the precursor sol of aluminum oxide reduces the motility of the particles, thereby making the $T_2$ relaxation time of this component shorter.

Figure 2:
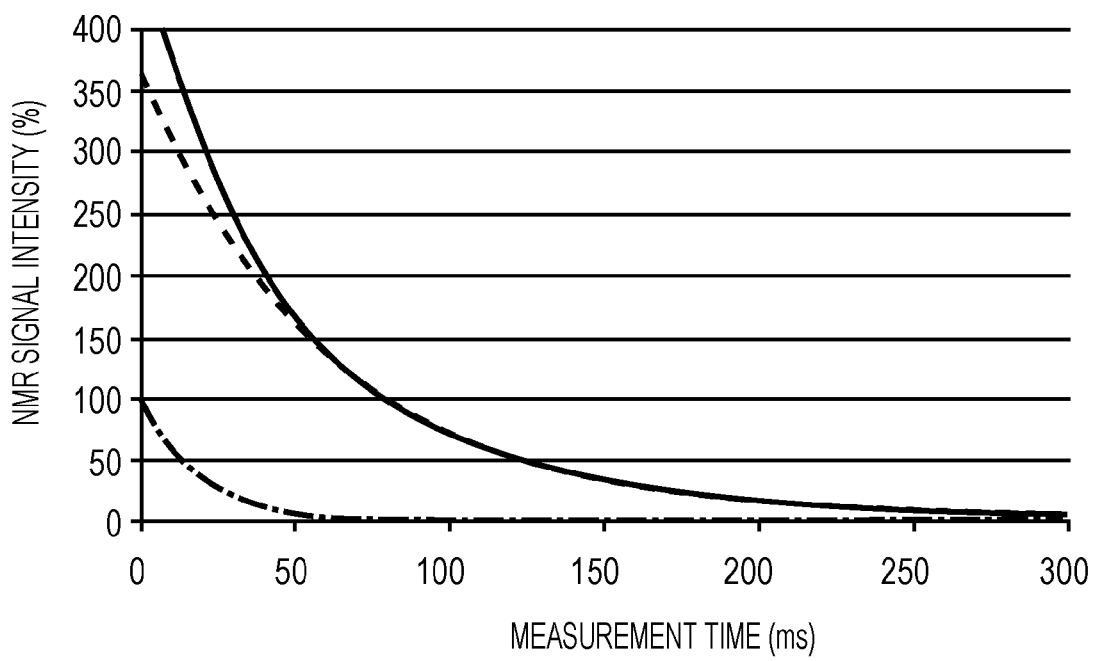
FIG. 2 shows an illustrative NMR signal obtained by the CPMG method.

FIG. 2 shows an illustrative NMR signal of a precursor sol of aluminum oxide according to an aspect of the invention along with the relaxation curves of two components therein. The NMR signal was measured by the CPMG method, and the relaxation curves were constructed by multicomponent curve fitting using equation (2). Pulsed NMR analysis of a precursor sol of aluminum oxide by the CPMG method yields an NMR signal, the time required to complete the measurement $t_{max}$, a longer $T_2$ relaxation time $T_{2L}$, and a shorter $T_2$ relaxation time $T_{2S}$. The obtained data are analyzed by multicomponent curve-fitting using equation (2) to determine the abundance levels $C_S$ and $C_L$ of two components, one with the shorter $T_2$ relaxation time (a lower degree of motility) and the other with the longer $T_2$ relaxation time (a higher degree of motility). Fitting an equation considering three or more components to a measured NMR signal is of too many degrees of freedom and does not give a unique set of abundance levels of the components; two-component curve fitting is suitable for the precursor sol of aluminum oxide according to an aspect of the invention.

More specifically, the precursor sol of aluminum oxide according to an aspect of the invention satisfies the following: When its pulsed-NMR $T_2$ relaxation curve of nuclide $^1$H includes two components with different $T_2$ relaxation times and the component with the longer $T_2$ relaxation time has an abundance level of $C_L$ (%) and the component with the shorter $T_2$ relaxation time has an abundance level of $C_S$ (%), the relative proportion $R_{CS}$ (%) of $C_S$ determined by equation (1) is in the range of 23.5% to 50.0%, both inclusive, preferably 30.0% to 45.0%, both inclusive:

$$R_{cs} = \frac{C_S}{C_S + C_L} \times 100 \quad (1)$$

By using pulsed NMR in this way, the abundance level of the component with the shorter $T_2$ relaxation time, i.e., the abundance level of the particles containing a hydrolysate and/or a condensate of an aluminum compound surrounded by solvent molecules, can be evaluated.

The precursor sol of aluminum oxide according to an aspect of the invention contains a condensate obtained by hydrolysis of an aluminum alkoxide and a solvent and also contains an organo aluminum compound represented by general formula (1). The organo aluminum compound of general formula (1) is composed of an aluminum atom and molecules of a β-diketone coordinated this aluminum atom:

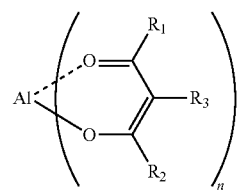

General formula (1)

(where $R_1$ and $R_2$ denote an alkyl, perfluoroalkyl, or allyl group of one to six carbon atoms, $R_3$ denotes a hydrogen atom, a halogen atom, or an alkyl, perfluoroalkyl, allyl, or aryl group of one to six carbon atoms, and n denotes an integer of 1 to 3, both inclusive).

The main ingredient of the precursor sol of aluminum oxide according to an aspect of the invention is a hydrolysate and/or a condensate of an aluminum compound, and these substances are formed by bringing the aluminum compound into contact with water in the solvent. When the aluminum compound is described as Al—$X_3$ (where X denotes an alkoxyl group, an acyloxyl group, a halogen-containing group, or a nitrate ion), its hydrolysate is a compound described as Al—$X_2$(OH), Al—X(OH)$_2$, or Al—(OH)$_3$. This hydrolysate produces free $H_2O$ or XH molecules and forms one or more Al—O—Al bonds through reaction between an OH group and another or between X and OH groups. The resulting product, which is a linear or branched compound having an Al—O—Al bond or bonds, is the condensate of the aluminum compound. The particles can be amorphous ones.

The amount of the particles containing a hydrolysate and/or a condensate of an aluminum compound in the precursor sol of aluminum oxide according to an aspect of the invention is in the range of 1 wt % to 7 wt %, both inclusive, preferably 2.5 wt % to 6 wt %, both inclusive, on a metal oxide basis. More than 7 wt % of the particles is too much; the sol would be so viscous that each single coating formed using this sol would often be too thick and uneven and would not have desired antireflective properties. Likewise, less than 1 wt % of the particles is too little; each single coating formed using the sol would be so thin that it is necessary to repeat the application and heating operations, leading to an increased number of operations and a greater possibility of poor coating appearance.

The average particle size of the particles containing a hydrolysate and/or a condensate of an aluminum compound is in the range of 7.5 nm to 35 nm, both inclusive, preferably 7.5 nm to 25 nm, both inclusive. An average particle size less than 7.5 nm would cause an increased amount of tensile stress occurring during the drying and/or baking operation following film formation and raise the risk of cracks. An average particle size exceeding 35 nm would cause the particles to aggregate while the sol is applied, making poor coating appearance more likely to occur.

The following provides specific examples of aluminum and other metal compounds that can be used.

Examples of aluminum compounds that can be used include aluminum ethoxide, aluminum isopropoxide, aluminum n-butoxide, aluminum sec-butoxide, aluminum tert-butoxide, aluminum acetylacetonate, and their oligomers as well as aluminum nitrate, aluminum chloride, aluminum acetate, aluminum phosphate, aluminum sulfate, and aluminum hydroxide.

Among these metal compounds, aluminum n-butoxide, aluminum sec-butoxide, and similar metal alkoxides are highly suitable for use as an ingredient of the sol.

Aluminum alkoxides, some examples of which are given above, are highly reactive with water and are rapidly hydrolyzed by contact with the moisture in the air or addition of water. Solutions containing an aluminum alkoxide are thus likely to cloud or form a precipitate. On the other hand, aluminum salts are difficult to dissolve in an organic solvent alone, and solutions containing an aluminum salt are instable. To avoid these issues, the starting solution for the preparation of a precursor sol of aluminum oxide usually contains a stabilizer.

The stabilizer is usually a β-diketone or a β-ketoester. In the solvent, the stabilizer is converted into an enolate by keto-enol tautomerism. Molecules of the enolate are then coordinated to aluminum atoms while eliminating an alcohol from the metal alkoxide. As a result, an organo metal compound is formed. The molecules of the stabilizer coordinated to multimeric forms of the metal alkoxide prevent the metal alkoxide from being rapidly hydrolyzed. As the hydrolysis of the metal alkoxide proceeds and particles grow, released enolate molecules are coordinated to the metal alkoxide molecules already surrounded by enolate molecules.

In this way, the stabilizer forms a chelate with the aluminum alkoxide. The organo aluminum compound formed in the precursor sol of aluminum oxide may possibly form aggregates, depending on its chemical structure. When an optical film formed using this sol is baked to make a coating, the particles produced by hydrolysis of the aluminum alkoxide in the film are expected to form bonds therebetween; however, such aggregates of the organo aluminum compound probably interfere with this process. Insufficient formation of interparticle bonds leads to insufficient formation of aluminum oxide bumps and thus to poor antireflective properties of the resulting coating. Furthermore, some kinds of organo aluminum compounds have a sublimation point of 150° C. of higher; baking at a temperature lower than 200° C. may fail to remove the organo aluminum compound from the aluminum oxide film completely. In particular, when the stabilizer is a β-ketoester, the formed organo aluminum compound often has a sublimation point of 150° C. or higher owing to transesterification.

Worse yet, a coating formed on an optical member using a sol made from a metal alkoxide containing at least aluminum and a stabilizer may have poor appearance such as unevenness because the organo aluminum compound existing in the sol may form aggregates while the coating is formed. Removing the precipitated aggregates of the organo aluminum compound from the precursor sol of aluminum oxide or decomposing the organo aluminum compound into compounds which can be removed even by baking at a relatively low temperature will ensure that the resulting coating has desired antireflective properties even when the baking temperature is lower than 200° C.

For these reasons, the precursor sol of aluminum oxide according to an aspect of the invention contains a β-diketone as a stabilizer. This β-diketone has a hydrogen atom, a halogen atom, or an alkyl, perfluoroalkyl, allyl, or aryl group of one to six carbon atoms in the α-position and an alkyl, perfluoroalkyl, or allyl group of one to six carbon atoms in the γ-positions.

More specifically, the β-diketone can be a compound represented by general formula (2):

$$R_1COCHR_3COR_2 \qquad \text{General formula (2)}$$

(where $R_1$ and $R_2$ denote an alkyl, perfluoroalkyl, or allyl group of one to six carbon atoms, and $R_3$ denotes a hydrogen atom, a halogen atom, or an alkyl, perfluoroalkyl, allyl, or aryl group of one to six carbon atoms).

The following provides specific examples of appropriate β-diketones.

Examples of appropriate β-diketones include acetylacetone, 3-methyl-2,4-pentanedione, 3-ethyl-2,4-pentanedione, 3-butyl-2,4-pentanedione, 3-pentyl-2,4-pentanedione, 3-hexyl-2,4-pentanedione, 3-isopropyl-2,4-pentanedione, 3-isobutyl-2,4-pentanedione, 3-isopentyl-2,4-pentanedione, 3-isohexyl-2,4-pentanedione, 3-phenyl-2,4-pentanedione, 3-chloroacetylacetone, 2,6-dimethyl-3,5-heptanedione, and 2,6-dimethyl-3,5-heptanedione.

The use of a β-diketone having a sterically bulky substituent is effective to prevent the resulting organo aluminum compound from aggregating. However, placing a sterically bulky substituent in the γ-positions of the β-diketone would lead to a failure to stabilize the aluminum alkoxide because the coordination of β-diketone molecules to aluminum alkoxide molecules would also be hindered. A substituent to prevent the aggregation of the organo aluminum compound is therefore placed in the α-position of the β-diketone. The α-position is on the opposite side to the ketone groups, and thus a substituent placed in this position does not cause steric hindrance of the coordination of β-diketone molecules to aluminum alkoxide molecules; this substituent only prevents the resulting organo aluminum compound from aggregating. However, self-interacting substituents (e.g., long-chain alkyl groups) would probably have only insufficient aggregation prevention effects. Incidentally, placing an electron-donating functional group in the α-position of the β-diketone makes the organo aluminum compound susceptible to electrophilic reaction at the α-carbon. When the β-diketone has an electron-donating functional group in the α-position, therefore, the resulting organo aluminum compound can break down into compounds with lower boiling points and thus is easier to remove from the film by baking.

The amount of the β-diketone, which depends on the kind of raw material metal compound, is preferably in the range of 0.3 mol to 2 mol, both inclusive, per mol of aluminum alkoxide. To produce the desired effects, the β-diketone is mixed with the alkoxide for a period of time before the addition of water.

Some amount of water is required to initiate hydrolysis. The adequate amount of water depends on the kind of solvent used and the concentration of the starting solution. The amount of water (the amount of water alone when an aqueous catalyst solution is used) is usually in the range of 0.5 mol to less than 2 mol per mol of aluminum alkoxide. For the coordination of solvent molecules to the particles containing a hydrolysate and/or a condensate of an aluminum compound, however, it is preferred that the amount of water is in the range of 1.5 mol to less than 2 mol, more preferably 1.65 mol to less than 2 mol, per mol of aluminum compound, depending on the kind of β-diketone used. In particular, when the β-diketone is 3-methyl-2,4-pentanedione or 3-ethyl-2,4-pentanedione, it is preferred that the amount of water (the amount of water alone when an aqueous catalyst solution is used) is in the range of 1.65 mol to less than 2 mol.

An aqueous catalyst solution can be used to promote some portion of the hydrolysis reaction. Examples of catalysts that can be used include acids such as hydrochloric acid and phosphoric acid and bases. When a catalyst is used, it is preferred that the concentration of the catalyst is 0.1 mol/L or less.

By adding an acid or base as a catalyst, the shape of the particles produced by the hydrolysis of the aluminum alkoxide can be controlled. Adding an acid or base also leads to a further improved stability of the precursor sol of aluminum oxide when the amount of the acid or base in the sol is in the range of 0.001 wt % to less than 0.06 wt %. For the coordination of solvent molecules to the particles containing a hydrolysate and/or a condensate of an aluminum compound, it is preferred that the amount of the acid or base in the sol is in the range of 0.02 wt % to less than 0.06 wt %.

The solvent can be any organic solvent in which the aluminum compound and other ingredients are uniformly dissolved and the particles do not aggregate. Examples of solvents that can be used include the following: monohydric alcohols such as methanol, ethanol, 1-propanol, 2-propanol, 1-butanol, 2-butanol, 2-methyl propanol, 1-pentanol, 2-pentanol, cyclopentanol, 2-methyl butanol, 3-methyl butanol, 1-hexanol, 2-hexanol, 3-hexanol, 4-methyl-2-pentanol, 2-methyl-1-pentanol, 2-ethyl butanol, 2,4-dimethyl-3-pentanol, 3-ethyl butanol, 1-heptanol, 2-heptanol, 1-octanol, and 2-octanol; polyhydric alcohols such as ethylene glycol and triethylene glycol; ether alcohols such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers such as dimethoxyethane, diglyme, tetrahydrofuran, dioxane, diisopropyl ether, and cyclopentyl methyl ether; esters such as ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; aliphatic or alicyclic hydrocarbons such as n-hexane, n-octane, cyclohexane, cyclopentane, and cyclooctane; aromatic hydrocarbons such as toluene, xylene, and ethylbenzene; ketones such as acetone, methyl ethyl ketone, methyl isobutyl ketone, and cyclohexanone; chlorinated hydrocarbons such as chloroform, methylene chloride, carbon tetrachloride, and tetrachloroethane; and aprotic polar solvents such as N-methylpyrrolidone, N,N-dimethylformamide, N,N-dimethylacetamide, and ethylene carbonate.

Monohydric alcohols of five to eight carbon atoms are good solvents for the aluminum compound and non-hygroscopic compared with the other solvents. Absorption of moisture in the solvent accelerates the hydrolysis of the aluminum compound and makes it difficult to control the particle size of the resulting particles. Furthermore, absorption of moisture in the applied sol causes the particles to aggregate, leading to nonuniform optical characteristics of the resulting coating. An ordinary low-boiling alcohol used as solvent may affect the optical characteristics of the resulting coating because the solvent is evaporated so quickly that the stabilizer, mentioned above, remains in the coating. With a monohydric alcohol of five to eight carbon atoms as solvent, however, the resulting coating contains little stabilizer residue because the solvent is evaporated together with the stabilizer during the drying and/or baking operation. Incidentally, monohydric alcohols of five to eight carbon atoms are highly hydrophobic and cannot be uniformly mixed with water; thus, it may be difficult to produce particles with a constant particle size when such a solvent is used alone. However, it is possible to use a monohydric alcohol of five to eight carbon atoms in combination with a water-soluble solvent.

The amount of the solvent in the precursor sol of aluminum oxide according to an aspect of the invention is in the range of 50 wt % to 98 wt %, both inclusive, preferably 60 wt % to 93 wt %, both inclusive.

When a mixed solvent is used, a possible combination of solvents is 50 wt % to 90 wt %, both inclusive, of a monohydric alcohol of five to eight carbon atoms and 10 wt % to 50 wt %, both inclusive, of a water-soluble solvent with a boiling point of 110° C. to 170° C., both inclusive. Too small an amount of the monohydric alcohol of five to eight carbon atoms causes the film formed using the sol to be uneven in thickness, leading to poor appearance of the resulting coating. Too large an amount of the monohydric alcohol of five to eight carbon atoms makes the hydrophobicity of the entire solvent so high that water molecules cannot be uniformly dispersed in the solvent.

The term water-soluble solvent, as used herein, refers to a solvent the solubility of which in water at 23° C. is 80 wt % or more. When a water-soluble solvent is used, its boiling point is in the range of 110° C. to 170° C., both inclusive. The use of a water-soluble solvent with a boiling point lower than 110° C. often causes moisture absorption or whitening associated with evaporation, while the use of a water-soluble solvent with a boiling point exceeding 170° C. causes the reflectance of the resulting coating to be nonuniform because this component of the mixed solvent can remain in the aluminum oxide film even after the drying operation. An example of water-soluble solvents that can be used is glycol ether.

The preparation process of the precursor sol of aluminum oxide according to an aspect of the invention may include heating the sol to promote the hydrolysis and condensation of the aluminum alkoxide. Depending on the boiling point of the solvent and the kind of β-diketone used, the heating temperature is preferably in the range of 60° C. to 150° C., both inclusive, more preferably 75° C. to 130° C., both inclusive. In particular, when the β-diketone is 3-methyl-2,4-pentanedione, it is preferred that the heating temperature is in the range of 75° C. to 130° C., both inclusive. Such a heat treatment makes the particles larger in particle size and leads to improved graininess of the sol.

Besides the aluminum compound, the precursor sol of aluminum oxide may contain one or more metal compounds selected from Zr, Si, Ti, Zn, and Mg compounds in a small amount. Examples of their possible forms include metal alkoxides, metal chlorides, and metal salts such as nitrates. Among these forms, metal alkoxides ensure that by-products generated during the preparation of the sol have little negative effect on the film formation properties of the sol in coating operations. When such a metal compound or compounds are used, the amount of the metal compound or the total amount of the metal compounds is preferably 10 mol % or less relative to 100 mol % of the aluminum compound.

Specific examples of zirconium alkoxides that can be used include zirconium tetramethoxide, zirconium tetraethoxide, zirconium tetra-n-propoxide, zirconium tetraisopropoxide, zirconium tetra-n-butoxide, and zirconium tetra-t-butoxide.

Examples of silicon alkoxides that can be used include ones represented by general formula $Si(OR)_4$ (where R is a methyl, ethyl, propyl, isopropyl, butyl, isobutyl, or any other lower alkyl group and may be the same or different from substituent to substituent).

Examples of titanium alkoxides that can be used include tetramethoxytitanium, tetraethoxytitanium, tetra-n-propoxytitanium, tetraisopropoxytitanium, tetra-n-butoxytitanium, and tetraisobutoxytitanium.

Examples of zinc compounds that can be used include zinc acetate, zinc chloride, zinc nitrate, zinc stearate, zinc oleate, and zinc salicylate. Among these, zinc acetate and zinc chloride are highly suitable.

Examples of magnesium compounds that can be used include magnesium alkoxides such as dimethoxymagnesium, diethoxymagnesium, dipropoxymagnesium, and dibutoxymagnesium, magnesium acetylacetonate, and magnesium chloride.

Among these metal compounds, zirconium tetraisopropoxide, zirconium tetra-n-butoxide, tetramethoxysilane, tetraethoxysilane, tetraisopropoxytitanium, tetra-n-butoxytitanium, dipropoxymagnesium, dibutoxymagnesium, and similar metal alkoxides are highly suitable for use as ingredients of the sol.

Yet another aspect of the invention is a method for manufacturing an optical member. The following describes this manufacturing method in detail.

The manufacturing method of an optical member according to an aspect of the invention includes (a) supplying the precursor sol of aluminum oxide to at least either side of a base, (b) drying and/or baking the precursor sol of aluminum oxide supplied to the base to form an aluminum oxide film, and (c) bringing the aluminum oxide film into contact with hot water or steam at 60° C. to 100° C., both inclusive, to make a crystalline matter containing aluminum oxide separate out, thereby forming a textured structure containing aluminum oxide crystals.

The present invention also has other aspects, and one is an optical member produced by this method for manufacturing an optical member. An optical member produced by this manufacturing method has an antireflection coating that is an aluminum oxide nanostructure and exhibits an apparent refractive index varying in the thickness direction while always being less than the specific refractive index of aluminum oxide.

A different aspect of the invention is an optical system having this optical member.

The optical member described above can have a crystalline layer made of a crystalline matter containing aluminum oxide as an antireflection coating on at least either side of the base.

FIGS. 3A to 3D illustrate an embodiment of the manufacturing method of an optical member according to an aspect of the invention.

Figure 3A:
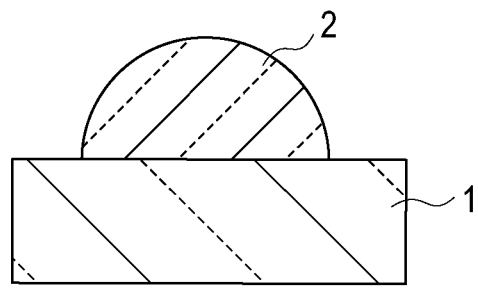
FIGS. 3A to 3D illustrate an embodiment of the method for manufacturing an optical member according to an aspect of the invention.
Figure 3B:
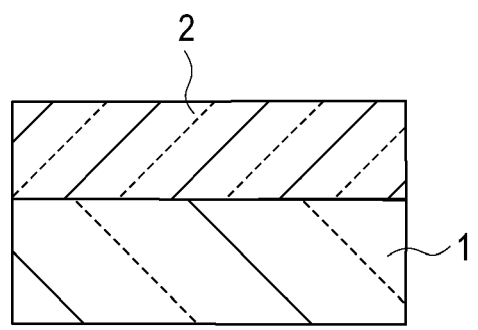

FIGS. 3A and 3B illustrate a base 1 and some amount of precursor sol of aluminum oxide 2 (the precursor sol of aluminum oxide described above) supplied to this base 1 in (a). The precursor sol of aluminum oxide 2 contains a condensate obtained by hydrolysis of an aluminum alkoxide, a solvent, and an organo aluminum compound represented by general formula (1) above. The organo aluminum compound of general formula (1) is composed of an aluminum atom and molecules of a β-diketone coordinated to this aluminum atom.

A possible way to supply the precursor sol of aluminum oxide 2 is to place a drop of the precursor sol of aluminum oxide 2 with a pipette or one or more nozzles as illustrated in FIG. 3A and then spread it over the base 1 as illustrated FIG. 3B. Other possible methods include attaching some amount of the precursor sol of aluminum oxide 2 to the base 1 through a slit and then spreading it over the base 1, attaching some amount of the precursor sol of aluminum oxide 2 to a plate and then transferring it to the base 1, and so forth. The precursor sol of aluminum oxide 2 (hereinafter also referred to as the sol 2) can also be supplied to the base 1 by immersing the base 1 in the sol 2.

Possible ways to spread the supplied precursor sol of aluminum oxide 2 over the base 1 as illustrated in FIG. 3B include spin coating, in which the base 1 is spun to spread a drop of the sol 2, and blade coating or roller coating, in which a blade or a roller is moved on the base 1 to spread a drop of the sol 2. It is also possible to supply and spread the precursor sol of aluminum oxide 2 in one operation. Examples of such methods include slit coating, in which some amount of the precursor sol of aluminum oxide 2 is supplied through a slit while the slit or the base 1 is moved to spread the attached sol 2, and printing methods in which some amount of the sol 2 is attached to a plate and then transferred while the plate or the base 1 is moved.

Another example is dip coating, in which the base 1 is immersed in the precursor sol of aluminum oxide 2 and then the base 1 is taken up at a constant rate. The production of an optical member having a complicated three-dimensional structure (e.g., a concave surface) often suffers from the difficulty of bringing the source of the precursor sol of aluminum oxide 2 near the base 1; however, spin coating can be used regardless of the structure of the optical member.

Figure 3C:
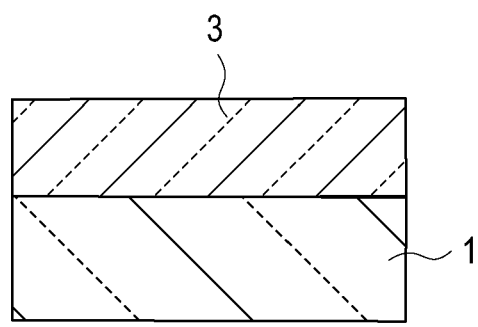

FIG. 3C illustrates an aluminum oxide film 3 formed in (b) by drying and/or baking the precursor sol of aluminum oxide 2 supplied on the base 1. By heating and drying the base 1, the solvent in the precursor sol of aluminum oxide 2 spread on the base 1 in (a) is evaporated, leaving an aluminum oxide film 3 as a layer of the particles deposited out of the sol 2. Additional heating promotes the condensation of the unreacted alkoxide and hydroxyl groups. The heating temperature is preferably in the range of 140° C. to 200° C., both inclusive. Heating at 140° C. or more makes certain that the solvent is evaporated, but heating at a temperature exceeding 200° C. may have negative impact on the base 1 or any surrounding components. Examples of heating methods that can be used include heating in a hot-air circulating oven, a muffle furnace, or an induction furnace and heating with an IR lamp.

Figure 3D:
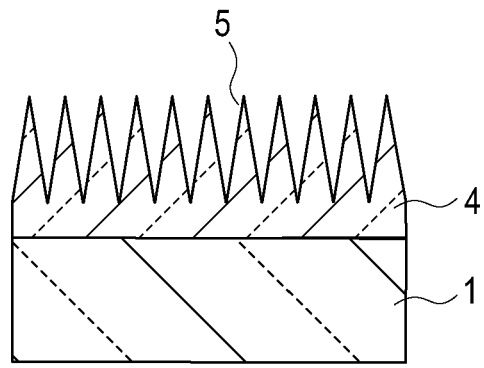

FIG. 3D illustrates a textured layer 4 formed on the base 1 in (c), and the textured layer 4 has a textured structure made up of features (bumps) 5. The textured layer 4 can be formed by bringing the aluminum oxide film 3 obtained in (b) into contact with hot water at a temperature of 60° C. to 100° C., both inclusive. The features (bumps) 5 are made up of aluminum oxide or hydroxide crystals in a hydrated or anhydrous form, e.g., boehmite crystals.

Possible ways to bring the aluminum oxide film 3 into contact with hot water include immersing the base 1 with the aluminum oxide film 3 formed thereon in hot water, bringing a stream or mist of hot water into contact with the aluminum oxide film 3, and so forth.

The textured layer used in this aspect of the invention can be an antireflection coating that is a nanostructure of some kind of material and exhibits an apparent refractive index varying in the thickness direction while always being less than the specific refractive index of the material.

An essential component of this antireflection coating is a fine structure each section of which has a span shorter than the wavelength of light the optical member will be used with. The sections of the fine structure are separate from each other with two or more closed spaces isolated from the outside atmosphere or open spaces leading to the outside atmosphere present therebetween. This configuration averages the refractive index of the material of the antireflection coating (the specific refractive index of the material) and that of the medium existing (or enclosed) in the spaces. The fine structure thus exhibits a refractive index lower than that of the material of the antireflection coating (the specific refractive index of the material), reducing the apparent refractive index of the antireflection coating as a whole. In other words, the specific refractive index of the material is the refractive index of a nonporous thin film of that material or the bulk refractive index of that material, while the apparent refractive index is the refractive index of the coating having the fine structure and is smaller owing to the presence of the spaces.

In a configuration where the proportion of spaces or that of the solid portion in the coating varies in the thickness direction, furthermore, this apparent refractive index also varies.

Figure 4:
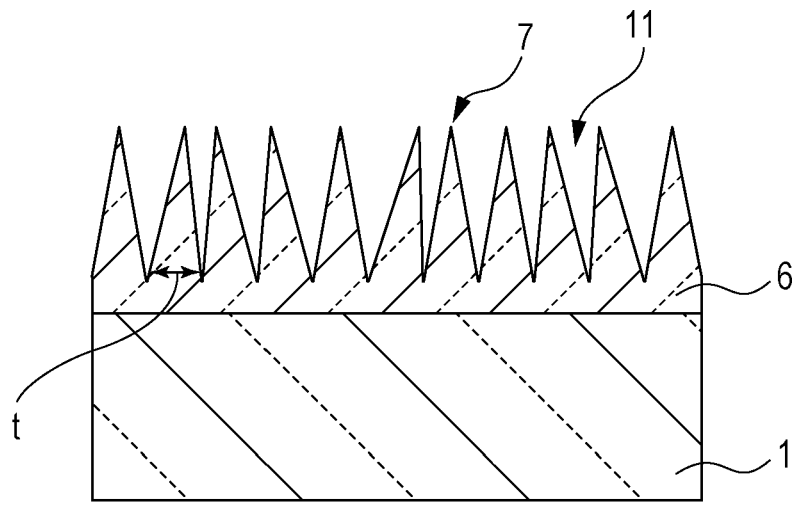
FIG. 4 outlines an embodiment of the optical member according to an aspect of the invention.

FIG. 4 schematically illustrates a cross-section of an antireflection coating used in this aspect of the invention, and this antireflection coating has a solid portion 7 and spaces 11. These components can be formed to make the apparent refractive index stepwise or continuously increase in the direction of the travel of light from the light-incident side or to make the apparent refractive index stepwise or continuously decrease in the direction of the travel of light from the light-incident side. In another possible arrangement, the antireflection coating can have optical characteristics described by a refractive index that is close to 1 in the outermost surface of the coating, or at the interface with the outside atmosphere, and gradually increases toward the specific refractive index of the material of the antireflection film (e.g., a refractive index from 1.4 to 3.0) as the depth increases from the outermost surface in the direction of the thickness of the antireflection coating.

It is also possible to stack two or more layers of fine structures having different proportions of spaces or the solid portion or to form a fine structure in accordance with some positional distribution, i.e., change the proportion of spaces or the solid portion from point to point. The antireflection coating is not smooth and has fine projections and depressions on its outermost surface side formed by spaces leading to the outside atmosphere, and the thickness (t) of each projection (bump) is smaller than the wavelength of light the optical member will be used with. For example, the thickness t can be on the order of nanometers.

Figure 8:
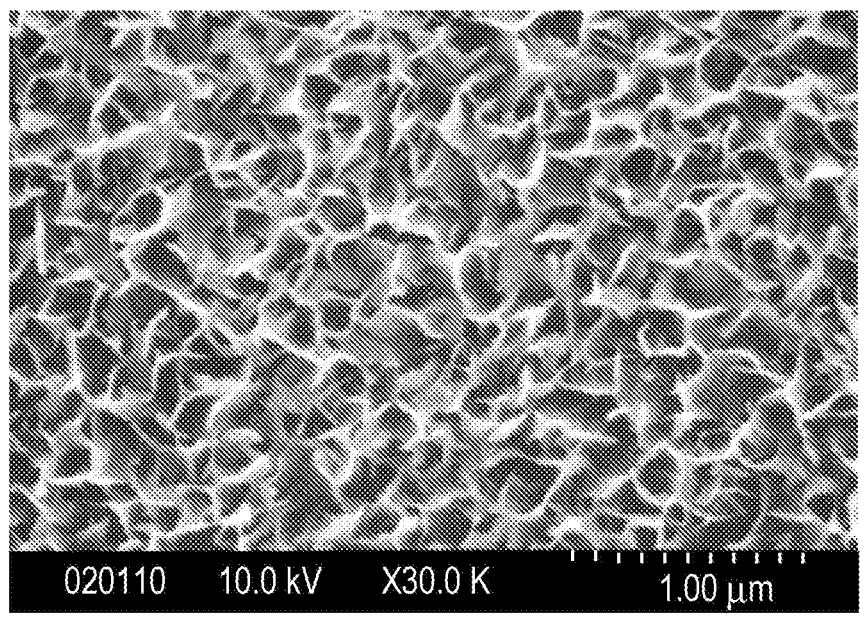
FIG. 8 is a surface electron microscopic image for illustrating an embodiment of the optical member according to an aspect of the invention.

Such a fine-textured structure is described by words such as moth-eye, SWS (sub-wavelength-structured), spongy, petal-like, textile-like, spiny, and whisker-like (refer to FIGS. 4 and 8 as well as Japanese Patent Laid-Open Nos. 9-202649, 2005-275372, and 2006-259711). FIG. 8 is a surface electron microscopic image for illustrating an embodiment of the optical member according to an aspect of the invention.

The material of the solid portion can be a metal oxide such as silicon oxide, zinc oxide, titanium oxide, magnesium oxide, zirconium oxide, or aluminum oxide, a metal fluoride such as magnesium fluoride, a metal oxide fluoride, a metal hydroxide, or any other suitable metal compound. Materials containing at least one of these compounds can also be used. It is also possible that the material of the solid portion contains more than one metal element; multielement materials such as bimetal or trimetal materials may also be used.

Furthermore, it is allowed that the material of the solid portion contains phosphorus, boron, or any similar element.

The solid portion can be of any crystallographic structure; the solid portion may be amorphous, microcrystalline, polycrystalline, a single crystal, or a mixture of amorphous and crystalline forms.

A specific example of the production process of the antireflection coating is as follows: A solid film formed by a gas-phase method (e.g., vacuum deposition, sputtering, or CVD), or a liquid-phase method (e.g., a sol-gel method, liquid coating, or spraying), and the solid film is heated or treated with warm water to have a textured structure made up of fine bumps on its surface.

For example, a textured structure made up of petal-like bumps can be obtained by forming an amorphous aluminum oxide film on a base by a sol-gel method and immersing the formed film in warm water to grow plate crystals containing aluminum oxide and aluminum hydroxide in a hydrated or anhydrous form, which are also referred to as boehmite.

It is also possible that another layer is interposed between this antireflection coating having fine projections and depressions (bumps) and the base. This intermediate layer can be a solid film having a refractive index intermediate between the apparent refractive index of the antireflection coating and the refractive index of the base. Specific examples of materials that can be used to make this intermediate layer include inorganic substances such as the metal compounds listed above to illustrate the material of the antireflection coating and organic substances such as polyimide and other resins.

In FIG. 4, an optical member produced by the manufacturing method according to an aspect of the invention has a base 1 and a textured layer 6 formed on it. The textured layer 6 can be a crystalline layer made of a crystalline matter containing aluminum oxide. On the textured layer 6 crystals of various sizes are randomly arranged, and their tips serve as features (bumps) 7 that form a textured structure. In order to adjust the height, size, and angle of the features (bumps) 7 and the bump interval, therefore, it is required to control the formation and growth of the crystals. In some cases, the textured layer 6 separates into the features (bumps) 7 and a lower stratum. This lower stratum is made of pure aluminum oxide or is based on aluminum oxide but contains 30 mol % or less of $ZrO_2$, $SiO_2$, $TiO_2$, ZnO, or MgO.

Figure 5:
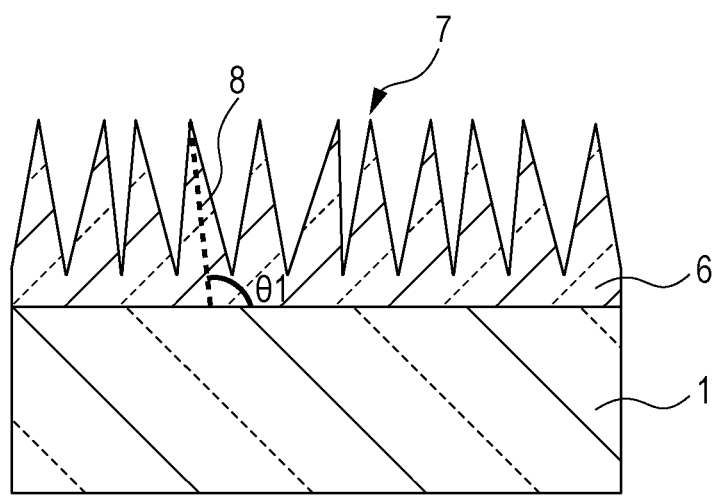
FIG. 5 outlines another embodiment of the optical member according to an aspect of the invention.

FIG. 5 outlines another embodiment of the optical member according to an aspect of the invention. The base 1 in FIG. 5 is a plate, a film, a sheet, or the like and thus has a flat surface. The mean angle of the bumps 7 to the surface of the base 1, i.e., the mean of the angle $\theta 1$ between the direction 8 each bump 7 points in and the base surface, is preferably in the range of 45° to 90°, both inclusive, more preferably 60° to 90°, both inclusive.

Figure 6:
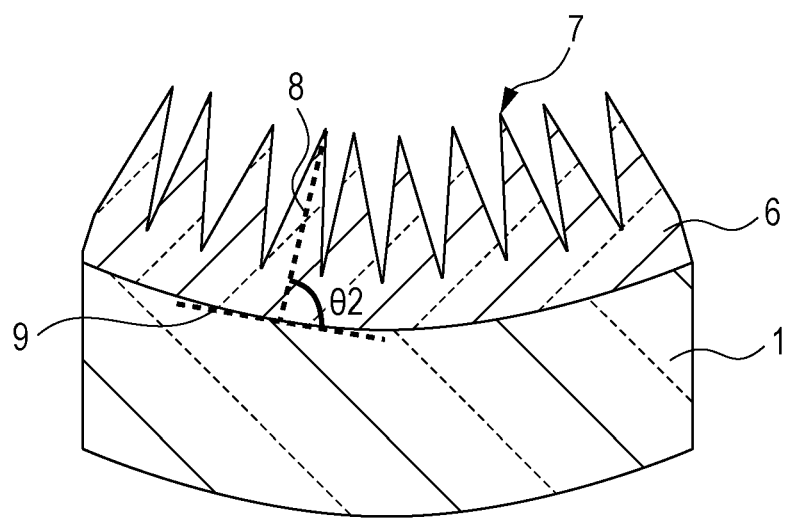
FIG. 6 outlines yet another embodiment of the optical member according to an aspect of the invention.

FIG. 6 outlines yet another embodiment of the optical member according to an aspect of the invention. The base 1 in FIG. 6 has a two- or three-dimensionally curved surface. The mean of the angle $\theta 2$ between the direction 8 each bump 7 points in and the tangent 9 to the base surface is preferably in the range of 45° to 90°, both inclusive, more preferably 60° to 90°, both inclusive. Some bumps 7 may have an angle $\theta 1$ or $\theta 2$ exceeding 90° owing to their inclination. For these bumps 7, the supplementary acute angle is used instead.

The thickness of the textured layer 6 is preferably in the range of 20 nm to 1000 nm, both inclusive, more preferably 50 nm to 1000 nm, both inclusive. Adjusting the thickness of the textured layer 6 to the range of 20 nm to 1000 nm, both inclusive, enhances the antireflective properties of the optical member brought about by the features (bumps) 7 and, furthermore, eliminates the risk that the mechanical strength of the features (bumps) 7 may be lost and thus is beneficial for the cost of producing the features (bumps) 7. Adjusting the thickness of the textured layer 6 to the range of 50 nm to 1000 nm, both inclusive, leads to further enhanced antireflective properties of the optical member.

In this aspect of the invention, the surface density of the textured structure made up of features (bumps) 7 is also important. The mean surface roughness Ra', which is an relevant index to evaluate this surface density and is an extension of the center-line average roughness to a plane, is preferably 5 nm or more, more preferably 10 nm or more, and even more preferably in the range of 15 nm to 100 nm, both inclusive. The surface area ratio Sr, another relevant index, is preferably 1.1 or more, more preferably 1.15 or more, and even more preferably in the range of 1.2 to 3.5, both inclusive.

The surface density of the textured structure made up of features (bumps) 7 can be evaluated by scanning probe microscopy (SPM). SPM observations yield the mean surface roughness Ra', i.e., an extension of the center-line average roughness Ra to a plane, and surface area ratio Sr of the bumpy layer 6. The mean surface roughness Ra' (nm) is an index created by applying the center-line average roughness Ra defined in JIS B0601 to the measurement plane and a three-dimensional extension of Ra and is described as the mean absolute deviation between the reference plane and the specified plane. The value Ra' is given by equation (3).

$$R'_a = \frac{1}{S_0} \int_{Y_B}^{Y_T} \int_{X_L}^{X_R} |F(X, Y) - Z_0| d_X d_Y \quad (3)$$

Ra': Mean surface roughness (nm)

$S_0$: Ideal area of the measurement plane, determined by $|X_R-X_L| \times |Y_T-Y_B|$ as if the measurement plane was flat F(X,Y): Height at the measurement point (X,Y); X and Y represent the X and Y coordinates, respectively $X_L$, $X_R$: Left- and right-hand limits of the X coordinate in the measurement plane $Y_B$, $Y_T$: Bottom and top limits of the Y coordinate in the measurement plane $Z_0$: Mean height in the measurement plane The surface area ratio Sr is determined by $Sr=S/S_0$ ($S_0$: ideal area of the measurement plane, determined as if the measurement plane was flat; S: the actual surface area of the measurement plane). A typical way to determine the actual surface area of the measurement plane is the following. First, the measurement plane is divided into very small triangles defined by the three points (A,B,C) closest to each other, and then the area ΔS of each small triangle is determined by the vector product. The unit area ΔS (ΔABC) is [s(s−AB)(s−BC)(s−AC)]0.5 (where AB, BC, and AC represent the lengths of the sides and s=0.5(AB+BC+AC)), and the sum of each ΔS is the surface area S to be determined. The bumps 7 have the intended antireflective effect when the surface density of the textured structure made up of bumps 7 is described by an Ra' of 5 nm or more and an Sr of 1.1 or more, and this antireflective effect becomes higher when the Ra' is 10 nm or more and the Sr is 1.15 or more. When the Ra' is 15 nm or more and the Sr is 1.2 or more, the optical member offers sufficient performance for practical purposes. An Ra' exceeding 100 nm or an Sr exceeding 3.5, however, leads to poor antireflective properties of the optical member because the effect of light scattering by the bumps 7 outweighs the antireflective effect.

Figure 7:
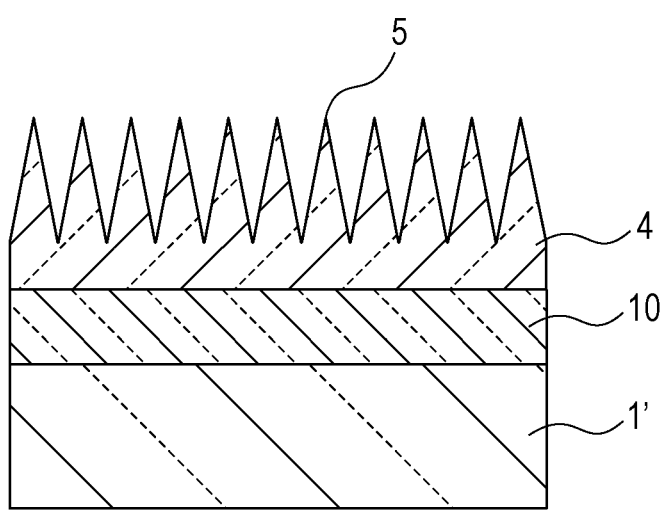
FIG. 7 outlines a different embodiment of the optical member according to an aspect of the invention.

The base mentioned herein may be a transparent component having a desired refractive index, and it may also be a component having more than one layer on its surface. For example, a layer containing a material other than aluminum oxide as main ingredient (hereinafter referred to as a non-aluminum-oxide layer) can be interposed between a base and the textured structure containing aluminum oxide crystals. FIG. 7 outlines a different embodiment of the optical member according to an aspect of the invention. The optical member illustrated in FIG. 7 has a base 1', a non-aluminum-oxide layer 10, and a textured layer 4 stacked in this order, and the textured layer 4 has features (bumps) 5 containing aluminum oxide crystals.

The main purpose of using the non-aluminum-oxide layer 10 is to adjust the difference in refractive index between the base 1' and the textured layer 4 having a textured structure (bumps) 5 containing aluminum oxide crystals. The non-aluminum-oxide layer 10 can therefore be a transparent film made of an inorganic material or an organic material.

Examples of inorganic materials that can be used to make the non-aluminum-oxide layer 10 include metal oxides such as $SiO_2$, $TiO_2$, $ZrO_2$, ZnO, and $Ta_2O_5$. When an inorganic material is used, the non-aluminum-oxide layer 10 can be formed by vacuum coating such as vapor deposition or sputtering or a sol-gel method based on the application of a precursor sol of a metal oxide, for example.

Examples of organic materials that can be used to make the non-aluminum-oxide layer 10 include organic polymers such as acrylic resin, epoxy resin, oxetane resin, maleimide resin, melamine resin, benzoguanamine resin, phenolic resin, resol resin, polycarbonates, polyesters, polyarylates, polyethers, polyureas, polyurethanes, polyamides, polyamide-imides, polyimides, polyketones, polysulfones, polyphenylenes, polyxylylenes, and polycycloolefins. When an organic material is used, the non-aluminum-oxide layer 10 can be formed by wet coating, i.e., applying a solution containing the organic material to the base 1', for example.

Furthermore, it is possible to treat the surface of the aluminum oxide bumps 5 unless the treatment spoils the antireflective properties of the optical member. For example, a $SiO_2$ thin film or a very thin film of FAS (fluorinated alkyl silane) or a fluorocarbon polymer can be formed to render the optical member resistant to scratches and stains.

The optical member according to an aspect of the invention can be made using a transparent base having a desired refractive index, offers an excellent antireflective effect against visible light, and has long-term weather resistance. This optical member can therefore be applied to displays or similar optical units of equipment including word processors, computers, televisions, and plasma display panels. Furthermore, the optical member according to this aspect of the invention can be applied to optical devices including polarizing plates for liquid crystal displays, devices made of glass materials for optical purposes and transparent plastics (e.g., sunglass lenses, prescription glass lenses, viewfinder lenses, prisms, fly-eye lenses, and toric lenses), and optical filters and sensors. Other possible applications of this optical member include the following: optical systems for imaging, observation (e.g., binoculars), or projection purposes (e.g., liquid crystal projectors) that have any of the above-listed optical devices; optical lenses used in scanning or other optical systems of such equipment as laser printers; and such optical parts as covers for measuring instruments and glass windows for automobiles, trains, and other vehicles.

EXAMPLES

The following illustrates some examples of the present invention to describe aspects of the invention in more detail. These examples should not be construed as limiting any aspect of the invention. Optical films having a textured structure on their surface were prepared as Examples and Comparative Examples and their characteristics were evaluated in the following way.

(1) Preparation of Precursor Sols of Aluminum Oxide 1 to 9

Aluminum sec-butoxide (ASBD; Kawaken Fine Chemicals) and a β-diketone were added and mixed by stirring in 2-ethyl methanol until a uniform solution was obtained. An aqueous catalyst solution, or more specifically 0.01M dilute hydrochloric acid, was added to a mixture of 2-ethyl butanol and 1-ethoxy-2-propanol. The obtained solution was slowly added to the aluminum sec-butoxide solution, and the resulting mixture was stirred for a while. The amounts of the solvents were adjusted to make the final mixing ratio of 2-ethyl butanol to 1-ethoxy-2-propanol equal to 7/3. The stirred mixture was transferred to a heated oil bath and stirred for at least 2 to 3 hours. In this way, precursor sols of aluminum oxide 1 to 9 were prepared. Table 1 lists the amounts of β-diketones and other ingredients used to prepare these sols along with the heating temperature of each sol.

(2) Viscosity Measurement

The viscosity of each precursor sol of aluminum oxide was measured using a rotary viscometer (Toki Sangyo RE80 viscometer) with its standard rotor (1° 34', R24). Prior to the measurement, the precursor sol of aluminum oxide was placed in a thermostatic bath set at 25° C. and left for 400 seconds until the temperature of the sol became constant. The results are summarized in Table 2.

(3) Average Particle Size Measurement

The average particle size of each precursor sol of aluminum oxide was measured using a particle size analyzer (Zetasizer Nano S; Malvern) with a glass cell at 25° C., with approximately 1 mL of the sol in the glass cell. The obtained data were analyzed using a refractive index of 1.5 and an absorption coefficient of 0.01 with the above viscosity as the solution viscosity, and the average particle size was determined from the peaks in the particle size distribution curve. The results are summarized in Table 2.

(4) Pulsed NMR Analysis

Each precursor sol of aluminum oxide was analyzed by pulsed NMR in the following way. A sample was placed in a pulsed NMR analyzer (a minispec analyzer; Bruker Optics), and the $T_2$ relaxation times of nuclide $^1H$ were measured by the CPMG method at a temperature of 27° C. The repetition time was set at 5 seconds, and the number of scans was set at 12. The following results are summarized in Table 2: the measurement time t, the longer and shorter $T_2$ relaxation times $T_{2L}$ and $T_{2S}$, the abundance levels $C_S$ and $C_L$ of the components with the shorter and longer $T_2$ relaxation times, and the relative proportion $R_{CS}$ of $C_S$, i.e., the component with the shorter $T_2$ relaxation time.

(5) Cracking Test

A glass disk base polished on one side and ground on the other side and having a diameter of approximately 30 mm and a thickness of approximately 1 mm was sonicated in an alkaline detergent and then dried in an oven. An adequate amount of the precursor sol of aluminum oxide under test was placed as a drop on the dried base and spread by 20 seconds of spin coating at a given rotation speed. The base was then baked in a hot-air circulating oven at 140° C. for 30 minutes to be coated with an amorphous aluminum oxide film. An additional amount of the same sol was spread over the base by 20 seconds of spin coating at a different rotation speed, and the base was baked in the hot-air circulating oven at 140° C. for 30 minutes to be coated with an amorphous aluminum acid film with a different thickness. This procedure was repeated to form several amorphous aluminum oxide films having different thicknesses. The thickness of each amorphous aluminum oxide film was measured by spectroscopic ellipsometry (J.A. Woollam EC-400), while the surface of each amorphous aluminum oxide film was observed using an optical microscope (Olympus MX50) with a 20× objective lens to determine the maximum crack-free thickness. The sol can be regarded as sufficiently effective to prevent cracks when its maximum crack-free thickness is 160 nm or more. The results are summarized in Table 2.

TABLE 1

| Sol | β-diketone | Amount of β-diketone, molar equivalents* | Aqueous catalyst solution molar equivalents* | 2-Ethyl butanol g | 1-Ethoxy-2-propanol g | Aluminum alkoxide wt %* | Heating temperature ° C. |
|---|---|---|---|---|---|---|---|
| Precursor sol of aluminum oxide 1 | Acetylacetone | 0.3 | 1.50 | 201.2 | 86.2 | 20.5 | 100 |
| Precursor sol of aluminum oxide 2 | 3-Methyl-2,4-pentanedione | 0.5 | 1.80 | 430.1 | 184.3 | 20.3 | 100 |
| Precursor sol of aluminum oxide 3 | 3-Methyl-2,4-pentanedione | 0.5 | 1.75 | 441.7 | 189.3 | 21.9 | 100 |
| Precursor sol of aluminum oxide 4 | 3-Methyl-2,4-pentanedione | 0.5 | 1.80 | 456.4 | 199.5 | 21.1 | 100 |
| Precursor sol of aluminum oxide 5 | 3-Methyl-2,4-pentanedione | 0.5 | 1.90 | 206.2 | 88.3 | 18.7 | 100 |
| Precursor sol of aluminum oxide 6 | 3-Methyl-2,4-pentanedione | 0.5 | 1.80 | 211.4 | 90.6 | 18.3 | 70 |
| Precursor sol of aluminum oxide 7 | Acetylacetone | 0.5 | 1.60 | 202.3 | 86.7 | 19.1 | 100 |
| Precursor sol of aluminum oxide 8 | 3-Methyl-2,4-pentanedione | 0.5 | 1.63 | 431.6 | 185.0 | 20.3 | 100 |
| Precursor sol of aluminum oxide 9 | 3-Methyl-2,4-pentanedione | 0.5 | 1.85 | 430.0 | 184.1 | 20.3 | 70 |

(Note 1)
*Each value in the column Aqueous catalyst solution, molar equivalents represents the number of molar equivalents of the aqueous catalyst solution relative to aluminum sec-butoxide.
(Note 2)
*Each value in the column Aluminum alkoxide, wt % represents the amount of the raw material aluminum sec-butoxide in percent by weight relative to the precursor sol of aluminum oxide.

Example 1

A flat glass disk (Ohara S-LAH55; $n_d$=1.83) was cleaned in the way described above. An adequate amount of precursor sol of aluminum oxide 1 was placed as a drop on the base and spread by 20 seconds of spin coating at a rotation speed of 1500 rpm. The base was then baked in a hot-air circulating oven at 140° C. for 30 minutes to be coated with an amorphous aluminum oxide film. The surface of this amorphous aluminum oxide film was observed using an optical microscope (Olympus MX50) with a 20× objective lens and found with cracks. Additional amorphous aluminum oxide films were then formed while the rotation speed of spin coating was increased by 500 rpm each time; the amorphous aluminum oxide films were formed by spin coating at rotation speeds of 2000 rpm, 2500 rpm, 3000 rpm, 3500 rpm, and so forth. Observations of the surface of each amorphous aluminum oxide film using the optical microscope (Olympus MX50)

with the 20× objective lens revealed that the films formed by spin coating at a rotation speed of 3000 rpm or more had no cracks. The thickness of each of the amorphous aluminum oxide films that had no cracks was then measured by spectroscopic ellipsometry (J.A. Woollam EC-400). For each sol, the minimum rotation speed of spin coating at which the resulting amorphous aluminum oxide film had no cracks is presented in Table 2 along with the thickness of the amorphous aluminum oxide film formed by spin coating at this rotation speed followed by 30 minutes of baking in the hot-air circulating oven at 140° C. (the maximum crack-free thickness).

Examples 2 to 6

The procedure of Example 1 was repeated except that the amorphous aluminum oxide film was prepared using one of precursor sols of aluminum oxide 2 to 6 instead of precursor sol of aluminum oxide 1.

Comparative Examples 1 to 3

The procedure of Example 1 was repeated except that the amorphous aluminum oxide film was prepared using one of precursor sols of aluminum oxide 7 to 9 instead of precursor sol of aluminum oxide 1.

Optical members produced using the precursor sol of aluminum oxide according to an aspect of the invention can be made using a transparent base having a desired refractive index, offer an excellent antireflective effect against visible light, and has long-term weather resistance. These optical members can therefore be applied to displays or similar optical units of equipment including word processors, computers, televisions, and plasma display panels and also to optical devices for liquid crystal displays.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-077503 filed Mar. 29, 2012, which is hereby incorporated by reference herein in its entirety.

What is claimed is:

1. A precursor sol of aluminum oxide including particles containing a hydrolysate or a condensate of an aluminum compound, a solvent, and an organo aluminum compound represented by general formula (1), wherein when a pulsed-NMR $T_2$ relaxation curve of nuclide $^1H$ of the precursor sol of

TABLE 2

| | Sol | Viscosity mPa·s | Average particle size nm | $t_{max}$* ms | $T_{2L}$* ms | $T_{2S}$* ms | $C_L$* % | $C_S$* % | $R_{CS}$* % | Rotation speed rpm | Film thickness nm |
|---|---|---|---|---|---|---|---|---|---|---|---|
| Example 1 | Precursor sol of aluminum oxide 1 | 5.26 | 8.1 | 2600 | 104 | 369 | 61.0 | 19.0 | 23.8 | 2000 | 180 |
| Example 2 | Precursor sol of aluminum oxide 2 | 5.22 | 10.0 | 1320 | 106 | 333 | 46.2 | 33.6 | 42.1 | 2500 | 190 |
| Example 3 | Precursor sol of aluminum oxide 3 | 5.76 | 12.5 | 1600 | 80 | 259 | 45.4 | 31.0 | 40.6 | 3500 | 200 |
| Example 4 | Precursor sol of aluminum oxide 4 | 10.22 | 34.3 | 1200 | 52 | 176 | 38.6 | 34.9 | 47.5 | 2500 | 265 |
| Example 5 | Precursor sol of aluminum oxide 5 | 7.03 | 11.0 | 1720 | 67 | 240 | 46.3 | 28.7 | 38.3 | 3000 | 180 |
| Example 6 | Precursor sol of aluminum oxide 6 | 9.98 | 23.0 | 1360 | 61 | 207 | 41.4 | 33.5 | 44.7 | 4000 | 205 |
| Comparative Example 1 | Precursor sol of aluminum oxide 7 | 4.50 | 8.6 | 3840 | 159 | 527 | 68.6 | 12.0 | 14.8 | 3000 | 155 |
| Comparative Example 2 | Precursor sol of aluminum oxide 8 | 4.08 | 4.3 | 5040 | 211 | 609 | 68.8 | 11.5 | 14.3 | 3000 | 140 |
| Comparative Example 3 | Precursor sol of aluminum oxide 9 | 4.86 | 4.9 | 3600 | 143 | 482 | 65.0 | 19.9 | 23.4 | 3500 | 150 |

(Note 3)*$t_{max}$ represents the time required to complete the measurement.
(Note 4)*$T_{2L}$ represents the longer $T_2$ relaxation time.
(Note 5)*$T_{2S}$ represents the shorter $T_2$ relaxation time.
(Note 6)*$C_S$ represents the abundance level of the component with the shorter $T_2$ relaxation time.
(Note 7)*$C_L$ represents the abundance level of the component with the longer $T_2$ relaxation time.
(Note 8)*$R_{CS}$ represents the relative proportion of $C_S$ calculated by [{$C_S/(C_S + C_L)$} × 100].

Performance Evaluation

The parameter $R_{CS}$ and the maximum crack-free thickness of Examples 1 to 6 were compared with those of Comparative Examples 1 to 3. The precursor sols of aluminum oxide according to an aspect of the invention produced amorphous aluminum oxide films with a maximum crack-free thickness falling within the range of 160 nm to 300 nm by application to a base by spin coating followed by 30 minutes of baking in a hot-air circulating oven at 140° C. and thus proved to be more effective to prevent cracks than the comparative examples.

Furthermore, the results in Example 1 and Comparative Example 1 and those in Example 2 and Comparative Example 3 indicate that pulsed NMR is an effective technique to evaluate the characteristics of precursor sols of aluminum oxide.

aluminum oxide includes two components with different $T_2$ relaxation times and the component with the longer $T_2$ relaxation time has an abundance level of $C_L$ (%) and the component with the shorter $T_2$ relaxation time has an abundance level of $C_S$ (%), a relative proportion $R_{CS}$ (%) of $C_S$ determined by equation (1) is in a range of 23.5% to 50.0%, both inclusive:

General formula (1)

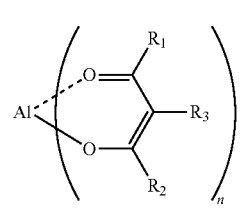

where $R_1$ and $R_2$ denote an alkyl, perfluoroalkyl, or allyl group of one to six carbon atoms, $R_3$ denotes a hydrogen atom, a halogen atom, or an alkyl, perfluoroalkyl, allyl, or aryl group of one to six carbon atoms, and n denotes an integer of 1 to 3, both inclusive $$R_{cs} = \frac{C_S}{C_S + C_L} \times 100. \tag{1}$$

2. The precursor sol of aluminum oxide according to claim 1, wherein the particles containing a hydrolysate or a condensate of an aluminum compound have an average particle size of 7.5 nm to 35 nm, both inclusive.

3. A method for manufacturing an optical member, comprising (a) supplying the precursor sol of aluminum oxide according to claim 1 to at least either side of a base, (b) drying or baking the precursor sol of aluminum oxide supplied to the base to form an aluminum oxide film, and (c) bringing the aluminum oxide film into contact with hot water or steam at 60° C. to 100° C., both inclusive, to make a crystalline matter containing aluminum oxide separate out, thereby forming a textured structure containing aluminum oxide crystals.

4. The method for manufacturing an optical member according to claim 3, wherein the precursor sol of aluminum oxide is supplied to the base by spin coating.

5. The method for manufacturing an optical member according to claim 3, wherein the aluminum oxide film has a thickness of 160 nm to 300 nm, both inclusive.

6. An optical member produced by the method for manufacturing an optical member according to claim 3.

7. The optical member according to claim 6, wherein the textured structure is an aluminum oxide nanostructure.

8. An optical system comprising the optical member according to claim 6.

* * * * *